(12) United States Patent
Aoki et al.

(10) Patent No.: US 6,643,603 B2
(45) Date of Patent: Nov. 4, 2003

(54) CHROMATIC DISPERSION DISTRIBUTION MEASUREMENT APPARATUS AND METHOD FOR THE SAME

(75) Inventors: Shoichi Aoki, Hamamatsu (JP); Akio Ichikawa, Hamamatsu (JP)

(73) Assignee: Ando Electric Co., Ltd., Tokyo (JP)

( * ) Notice: Subject to any disclaimer, the term of this patent is extended or adjusted under 35 U.S.C. 154(b) by 34 days.

(21) Appl. No.: 10/050,811

(22) Filed: Jan. 18, 2002

(65) Prior Publication Data

US 2002/0107655 A1 Aug. 8, 2002

(30) Foreign Application Priority Data

Feb. 7, 2001 (JP) ......................................... 2001-031317

(51) Int. Cl.[7] .............................................. G06F 15/00
(52) U.S. Cl. ........................ 702/127; 356/73.1; 356/450; 702/22; 702/28
(58) Field of Search ............................ 702/22, 28, 127, 702/128; 356/73.1, 450; 359/495

(56) References Cited

U.S. PATENT DOCUMENTS

| 4,752,125 | A | * | 6/1988 | Schicketanz et al. | ...... 356/73.1 |
| 5,406,368 | A | * | 4/1995 | Horiuchi et al. | ...... 356/73.1 |
| 5,956,131 | A | | 9/1999 | Mamyshev et al. | ...... 356/73.1 |
| 6,118,523 | A | * | 9/2000 | Brener et al. | ...... 356/73.1 |

FOREIGN PATENT DOCUMENTS

| EP | 0 819 926 | 1/1998 |
| JP | 10-083006 | 3/1998 |

* cited by examiner

Primary Examiner—John Barlow
Assistant Examiner—John Le
(74) Attorney, Agent, or Firm—Oliff & Berridge, PLC

(57) ABSTRACT

A chromatic dispersion distribution measurement apparatus, comprises: a chromatic dispersion value calculation unit for calculating a plurality of actual chromatic dispersion values in an optical device at a plurality of wavelengths; and a chromatic dispersion interpolation unit for interpolating an expected chromatic dispersion value between the actual chromatic dispersion values calculated by the chromatic dispersion value calculation unit, in order to obtain a chromatic dispersion distribution as a function of wavelength.

9 Claims, 4 Drawing Sheets

CHROMATIC DISPERSION DISTRIBUTION MEASUREMENT APPARATUS AND METHOD FOR THE SAME

BACKGROUND OF THE INVENTION

1. Field of the Invention

The present invention relates to a chromatic dispersion distribution measurement apparatus for measuring a chromatic dispersion distribution in an optical device to be measured, such as an optical fiber, and a method for the same.

2. Description of Related Art

In recent years, in order to satisfy the demands for high speed information communications, optical communication systems using optical fibers have been constructed. One of the factors in preventing the high speed signal transmission and the long transmission distance in the above optical communication systems, is the chromatic dispersion. The chromatic dispersion is a phenomenon caused by varying the speeds of lights transmitted in a medium, with the wavelength of the light. In the construction of the optical communication systems, it is necessary to grasp the chromatic dispersion characteristic in detail.

A chromatic dispersion distribution measurement apparatus for measuring the chromatic dispersion is shown in, for example, Japanese Patent Application Publication No. Tokukai-Hei 10-83006 (corresponding to the U.S. Pat. No. 5,956,131 and the European Patent Application No. 0819926 A2) In the publication, the chromatic dispersion distribution measurement apparatus measures the dispersion distribution in a longitudinal direction of a fiber to be measured, as follows. Two lights having different wavelengths from each other are inputted into the fiber to be measured. A specific wavelength component is extracted by an optical bandpass filter from a four-wave mixed light caused by the interaction between these two lights. A light having the extracted specific wavelength component is inputted into an Optical Time Domain Reflectometer (OTDR) to obtain the data to be used for calculating the chromatic dispersion distribution.

The chromatic dispersion distribution measurement apparatus described above measures the chromatic dispersion distribution in a specific wavelength. Therefore, it is impossible to measure a chromatic dispersion slope and a zero-dispersion wavelength (the wavelength at which the chromatic dispersion value is zero) because such measurements require extensive data over a considerable wavelength range. This makes it difficult to grasp the chromatic dispersion characteristics of the fiber to be measured.

SUMMARY OF THE INVENTION

In order to solve the above-described problems, an object of the present invention is to provide a chromatic dispersion distribution measurement apparatus and a method for the same, which interpolate the chromatic dispersion value at an optional wavelength to enable the measurement of the chromatic dispersion slope and the zero-dispersion wavelength.

That is, in accordance with the first aspect of the present invention, a chromatic dispersion distribution measurement apparatus, comprises:

a plurality of light sources selected from the group consisting of two variable wavelength light sources and at least three fixed-wavelength light sources which emit lights having different wavelengths from one another;

a chromatic dispersion distribution calculation unit for calculating a plurality of actual chromatic dispersion values in an optical device to be measured when a plurality of pairs of lights having different wavelengths from each other, which are emitted from the light sources, are inputted into the optical device to be measured;

a chromatic dispersion interpolation unit for interpolating an expected chromatic dispersion value between the actual chromatic dispersion values calculated by the chromatic dispersion distribution calculation unit, in order to obtain a chromatic dispersion distribution at an optional wavelength and at an optional transmission distance along the optical device to be measured;

a dispersion slope calculation unit for calculating a dispersion slope at the optional wavelength and at the optional transmission distance in accordance with the chromatic dispersion distribution; and a zero dispersion wavelength calculation unit for calculating a zero dispersion wavelength at the optional transmission distance in accordance with the chromatic dispersion distribution.

In accordance with the second aspect of the present invention, a chromatic dispersion distribution measurement method, comprises:

calculating a plurality of actual chromatic dispersion values in an optical device to be measured when a plurality of pairs of lights having different wavelengths from each other are inputted into the optical device to be measured;

interpolating an expected chromatic dispersion value between the calculated actual chromatic dispersion values, in order to obtain a chromatic dispersion distribution at an optional wavelength and at an optional transmission distance along the optical device to be measured;

calculating a dispersion slope at the optional wavelength and at the optional transmission distance in accordance with the chromatic dispersion distribution; and calculating a zero dispersion wavelength at the optional transmission distance in accordance with the chromatic dispersion distribution.

According to the first and the second aspects of the present invention, the dispersion slope at the optional wavelength and at the optional transmission distance and the zero dispersion wavelength at the optional transmission distance in the optical device to be measured can be calculated.

The chromatic dispersion interpolation unit may fit a plurality of the actual chromatic dispersion values calculated by the chromatic dispersion distribution calculation unit, into a predetermined chromatic dispersion equation.

The interpolating may be carried out by fitting a plurality of the calculated actual chromatic dispersion values into a predetermined chromatic dispersion equation.

As a predetermined chromatic dispersion equations, any equation can be used as long as a plurality of the chromatic dispersion values are fitted into it.

Therefore, from the chromatic dispersion values at the optional wavelengths, it is possible to grasp the chromatic dispersion distribution characteristics of the optical device to be measured.

The chromatic dispersion interpolation unit may employ a linear approximation by drawing a straight line between the actual chromatic dispersion values; and the dispersion slope calculation unit determines the dispersion slope by calculating a slope of the straight line.

The interpolating may be carried out by employing a linear approximation by drawing a straight line between the calculated actual chromatic dispersion values; and the dispersion slope calculating is carried out by calculating a slope of the straight line.

Therefore, the dispersion slope at the optional transmission distance in the optical device to be measured can be readily calculated with this technique, in particular, when the internal between the actual chromatic dispersion values is short.

In accordance with the third aspect of the present invention, a chromatic dispersion distribution measurement apparatus, comprises:

a chromatic dispersion value calculation unit for calculating a plurality of actual chromatic dispersion values in an optical device at a plurality of wavelengths; and a chromatic dispersion interpolation unit for interpolating an expected chromatic dispersion value between the actual chromatic dispersion values calculated by the chromatic dispersion value calculation unit, in order to obtain a chromatic dispersion distribution as a function of wavelength.

The chromatic dispersion distribution measurement apparatus may further comprise a dispersion slope calculation unit for calculating a dispersion slope at an optional wavelength in accordance with the chromatic dispersion distribution.

The chromatic dispersion distribution measurement apparatus may further comprise a zero dispersion wavelength calculation unit for calculating a zero dispersion wavelength in accordance with the chromatic dispersion distribution.

The chromatic dispersion interpolation unit may fit the actual chromatic dispersion values calculated by the chromatic dispersion value calculation unit, into a predetermined chromatic dispersion equation.

The predetermined chromatic dispersion equation may be a Sellmeier's formula.

The chromatic dispersion interpolation unit may employ a linear approximation by drawing a straight line between the actual chromatic dispersion values; and the dispersion slope calculation unit may determine the dispersion slope by calculating a slope of the straight line.

In accordance with the fourth aspect of the present invention, a chromatic dispersion distribution measurement method, comprises:

calculating a plurality of actual chromatic dispersion values in an optical device at a plurality of wavelengths; and interpolating an expected chromatic dispersion value between the calculated actual chromatic dispersion values, in order to obtain achromatic dispersion distribution as a function of wavelength.

The chromatic dispersion distribution measurement method may further comprise: calculating a dispersion slope at an optional wavelength in accordance with the chromatic dispersion distribution.

The chromatic dispersion distribution measurement method may further comprise: calculating a zero dispersion wavelength in accordance with the chromatic dispersion distribution.

The interpolating may be carried out by fitting the calculated actual chromatic dispersion values into a predetermined chromatic dispersion equation.

The predetermined chromatic dispersion equation may be a Sellmeier's formula.

The interpolating may be carried out by employing a linear approximation by drawing a straight line between the calculated actual chromatic dispersion values; and the dispersion slope calculating may be carried out by calculating a slope of the straight line.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, an embodiment of the present invention will be explained in detail with reference to the drawings. Firstly, the structure of the embodiment will be explained.

Figure 1:
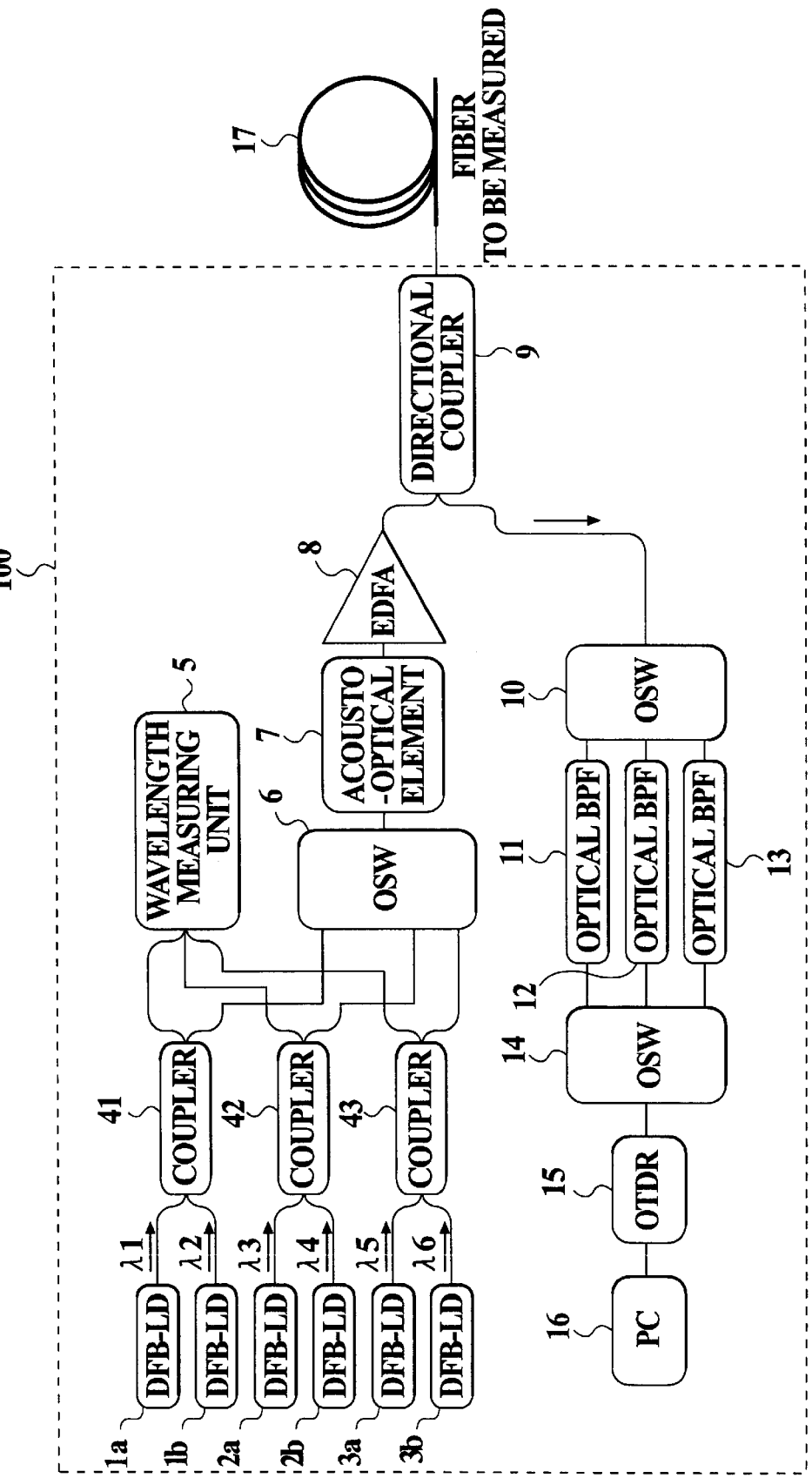
FIG. 1 is a block diagram showing a structure of an optical fiber chromatic dispersion distribution measurement apparatus to which the present invention is applied.

FIG. 1 is a block diagram showing the structure of the optical fiber chromatic dispersion distribution measurement apparatus 100 to which the present invention is applied. In FIG. 1, the optical fiber chromatic dispersion distribution measurement apparatus 100 comprises six distributed feedback-laserdiodes (DFB-LD) 1a, 1b, 2a, 2b, 3a, and 3b, three couplers 41, 42, and 43, a wavelength measuring unit 5, an optical switch (OSW) 6, an acousto-optical element 7, an erbium-doped fiber amplifier (EDFA) 8, a directional coupler 9, an optical switch (OSW) 10, three optical bandpass filters (BPF) 11, 12, and 13, an optical switch (OSW) 14, an optical time domain reflectometer (OTDR) 15, a personal computer (PC) 16 and the like. A fiber 17 to be measured is connected with the optical fiber chromatic dispersion distribution measurement apparatus 100.

The DFB-LDs 1a and 1b are light sources emitting lights of wavelengths $\lambda 1$ and $\lambda 2$ ($\lambda 1<\lambda 2$), respectively. The DFB-LDs 2a and 2b are light sources emitting lights of wavelengths $\lambda 3$ and $\lambda 4$ ($\lambda 3<\lambda 4$), respectively. The DFB-LDs 3a and 3b are light sources emitting lights of wavelengths $\lambda 5$ and $\lambda 6$ ($\lambda 5<\lambda 6$), respectively.

The coupler (coupler unit) 41 couples two lights outputted from the DFB-LDs 1a and 1b. The coupler 42 couples two lights outputted from the DFB-LDs 2a and 2b. The coupler 43 couples two lights outputted from the DFB-LDs 3a and 3b.

The wavelength measuring unit 5 monitors the waveform of the coupled lights outputted from the couplers 41, 42, and 43. The OSW 6 performs switching operation so as to pass one out of three kinds of coupled lights outputted from the couplers 41, 42, and 43.

The acousto-optical element 7 shapes a waveform of the coupled light outputted from the couplers 41, 42, and 43 via the OSW6, into a pulse form. The EDFA 8 amplifies the pulse light outputted from the acousto-optical element 7.

The directional coupler 9 is connected with the fiber 17 to be measured. The directional coupler 9 outputs the pulse light amplified by the EDFA 8, to the fiber 17 to be measured. Further, the directional coupler 9 outputs all of the reflected lights including the four-wave mixing (FWM) light, which are generated by the fiber 17 to be measured, to the optical BPFs 11, 12, and 13 via the OSW 10.

The four-wave mixing (FWM) is a phenomenon caused by the non-linearity of a plurality of lights having different wavelengths from each other in an optical fiber. For example, when two lights have wavelengths $\lambda_1$ and $\lambda_2$ respectively, a wavelength $\lambda_3$ of the FWM light (Stokes light) caused by this phenomenon and a wavelength $\lambda_4$ of the FWM light (anti-Stokes light) caused by the phenomenon satisfy $\lambda_2-\lambda_1=\lambda_1-\lambda_4=\lambda_3-\lambda_2$.

The OSW 10 performs switching operation so that one kind of FWM light outputted from the fiber 17 to be measured via the directional coupler 9, inputs into a specific optical BPF. For example, the FWM light corresponding to the coupled light of the wavelengths $\lambda 1$ and $\lambda 2$ is inputted into the optical BPF 11, the FWM light corresponding to the coupled light of the wavelengths $\lambda 3$ and $\lambda 4$ is inputted into the optical BPF 12, and the FWM light corresponding to the coupled light of the wavelengths $\lambda 5$ and $\lambda 6$ is inputted into the optical BPF 13.

The optical BPFs 11, 12, and 13 extract only a specific wavelength of light (the Stokes light or the anti-Stokes light) out of the FWM lights outputted from the fiber 17 to be measured via the OSW 10, and output the extracted light to the OTDR 15 via the OSW 14. In this embodiment, the optical BPFs 11, 12, and 13 extract only the Stokes light.

The OSW 14 performs switching operation so as to pass one out of three kinds of Stokes lights extracted by the optical BPFs 11, 12, and 13.

The OTDR 15 measures a loss distribution of input light to the fiber 17 to be measured, based on the passed light (Stokes light) from the optical BPFs 11, 12, and 13. Hereinafter, the loss distribution is frequently called an OTDR waveform. The OTDR waveform data obtained from the OTDR 15 is the intensity distribution data of the backscattered light which is generated at any portions of the fiber 17 to be measured, as a function of the transmission distance. The intensity cyclically varies with the transmission distance, that is, the intensity oscillates. Therefore, the transmission distance corresponds to the phase $\theta(\lambda)$ in the cyclic variation (oscillation) of the intensity distribution.

The PC 16 performs achromatic dispersion distribution calculating process (shown in FIG. 2) in the fiber 17 to be measured, based on the OTDR waveform data obtained from the OTDR 15. Further, the PC 16 performs a dispersion slope and zero-dispersion wavelength process (shown in FIG. 3) in arbitrary transmission distance along the fiber 17 to be measured, based on the chromatic dispersion distribution value calculated by the chromatic dispersion distribution calculating process.

When each two lights having different wavelengths from each other, which are outputted from the DFB-LDs 1a and 1b, the DFB-LDs 2a and 2b and the DFB-LDs 3a and 3b, respectively, are supplied to the fiber 17 to be measured through the directional coupler 9, the fiber 17 to be measured generates FWM lights by each of the interactions between two lights.

Next, the operation of the embodiment will be explained. In the beginning, with reference to the flow chart shown in FIG. 2, the chromatic dispersion distribution calculating process for calculating a chromatic dispersion distribution value in accordance with the OTDR waveform data obtained from the OTDR 15, which is carried out by the PC 16, will be explained.

First of all, the PC 16 executes the fast Fourier transform (FFT) of the OTDR waveform data, in order to calculate the waveform data expressed by a frequency spectrum (Step S1). Next, in a plurality of waveform data expressed by the frequency spectrum, the PC 16 executes the inverse Fourier transform (inverse FFT) of only the data at positive frequencies (Step S2). Then, the PC 16 calculates the data having the phase shifted by 90° from the original OTDR waveform data (Step S3).

The PC 16 plots the waveform data obtained in the Step S3 on a complex plane (Step S4). Then, each phase difference $\Delta\theta(\lambda)$ between two adjacent plotted data is calculated (Step S5). Then, the PC 16 calculates the chromatic dispersion distribution value by using a predetermined operation processing, based on the calculated phase difference $\Delta\theta(\lambda)$ (Step S6).

By performing the above-described chromatic dispersion distribution calculating process on each of the OTDR waveform data corresponding to the three kinds of Stokes lights, the dispersion distribution values at three different wavelengths can be acquired.

Figure 2:
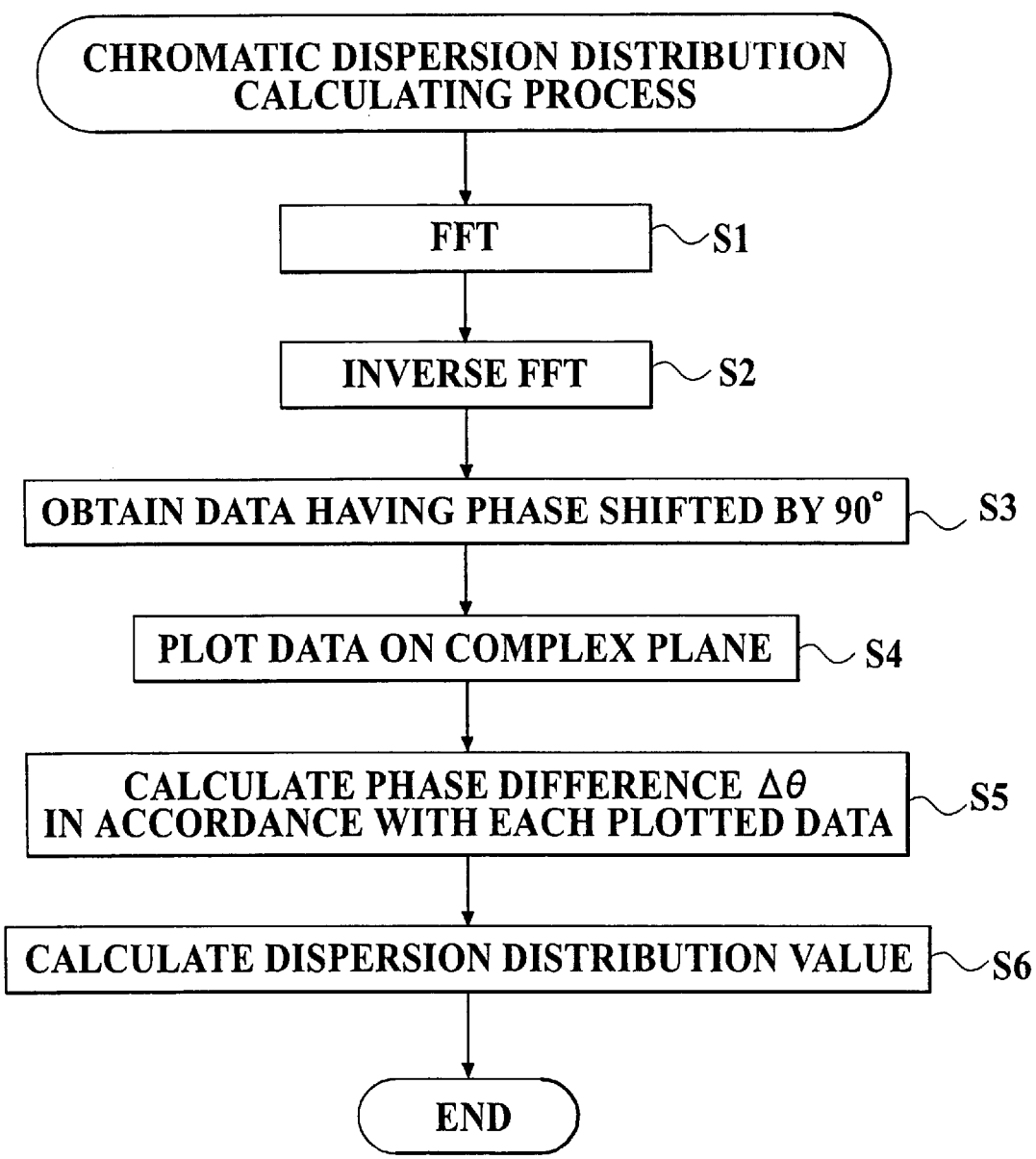
FIG. 2 shows a flow chart for explaining a chromatic dispersion distribution calculating process for calculating a chromatic dispersion distribution in the optical fiber to be measured, which is carried out by the PC.
Figure 3:
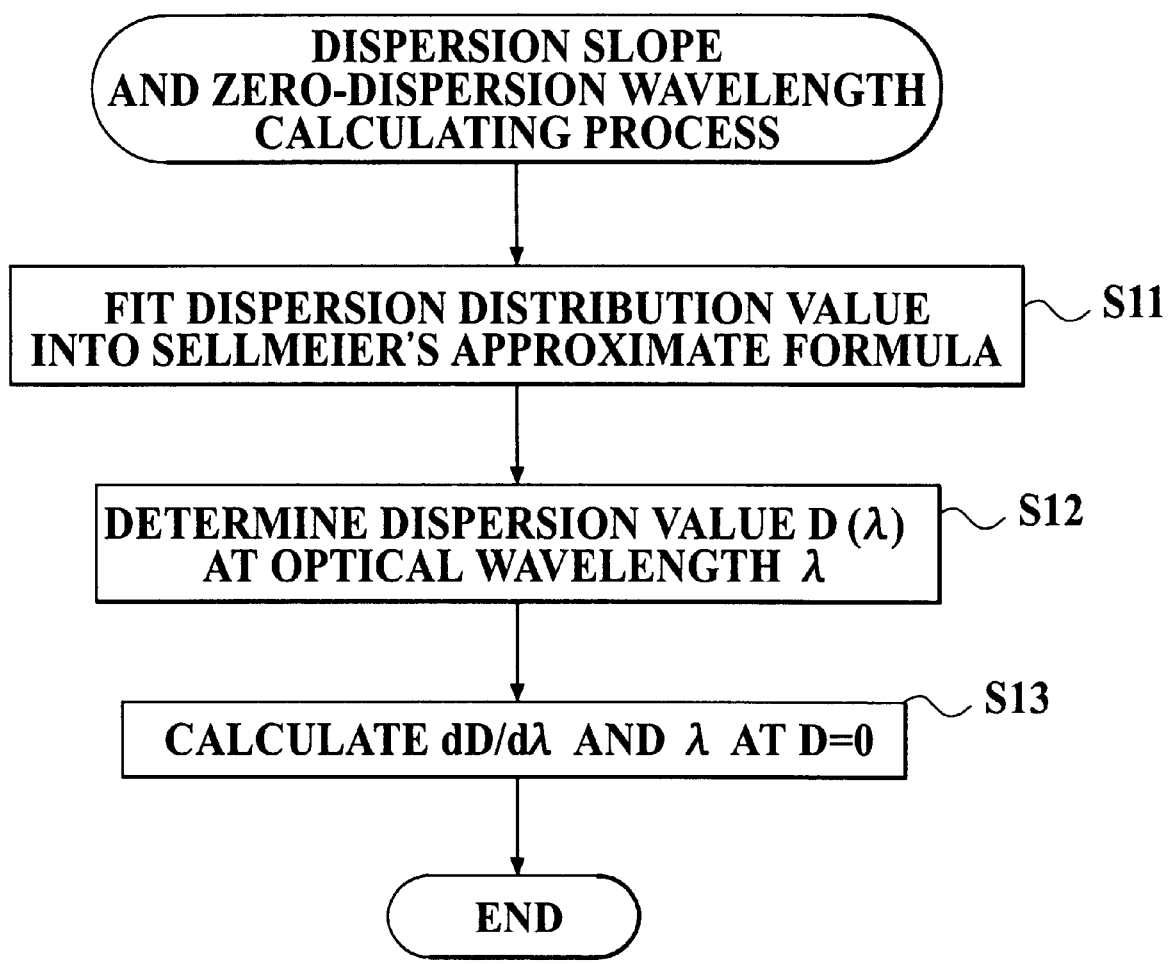
FIG. 3 shows a flowchart for explaining a dispersion slope and zero-dispersion wavelength calculating process for calculating a dispersion slope and a zero-dispersion wavelength in the optical fiber to be measured, which is carried out by the PC.

Next, with reference to the flow chart shown in FIG. 3, the dispersion slope and zero-dispersion wavelength calculating process for calculating a dispersion slope and a zero-dispersion wavelength, based on the dispersion distribution values obtained by the chromatic dispersion distribution calculating process shown in FIG. 2, will be explained.

First of all, the PC 16 fits the measured dispersion distribution values obtained by the chromatic dispersion distribution calculating process, into the Sellmeier's approximate formula to be described below (Step S11). If the fiber 17 to be measured is a single-mode fiber which allows only a single-mode transmission, the Sellmeier's approximate formula which describes dispersion value D, is given by the following equation (1):

$$D(\lambda)=a+b\lambda^2+c\lambda^{-2} \tag{1}$$

where a, b, and c are constants, and where $\lambda$ is the wavelength.

In the case of fibers other than single-mode, the Sellmeier's approximate formula which describes dispersion value D, is given by the following equation (2):

$$D(\lambda)=a\lambda^4+b\lambda^2+c+d\lambda^{-2}+e\lambda^{-4} \tag{2}$$

where a, b, c, d, and e are constants, and where is the wavelength.

Figure 4:
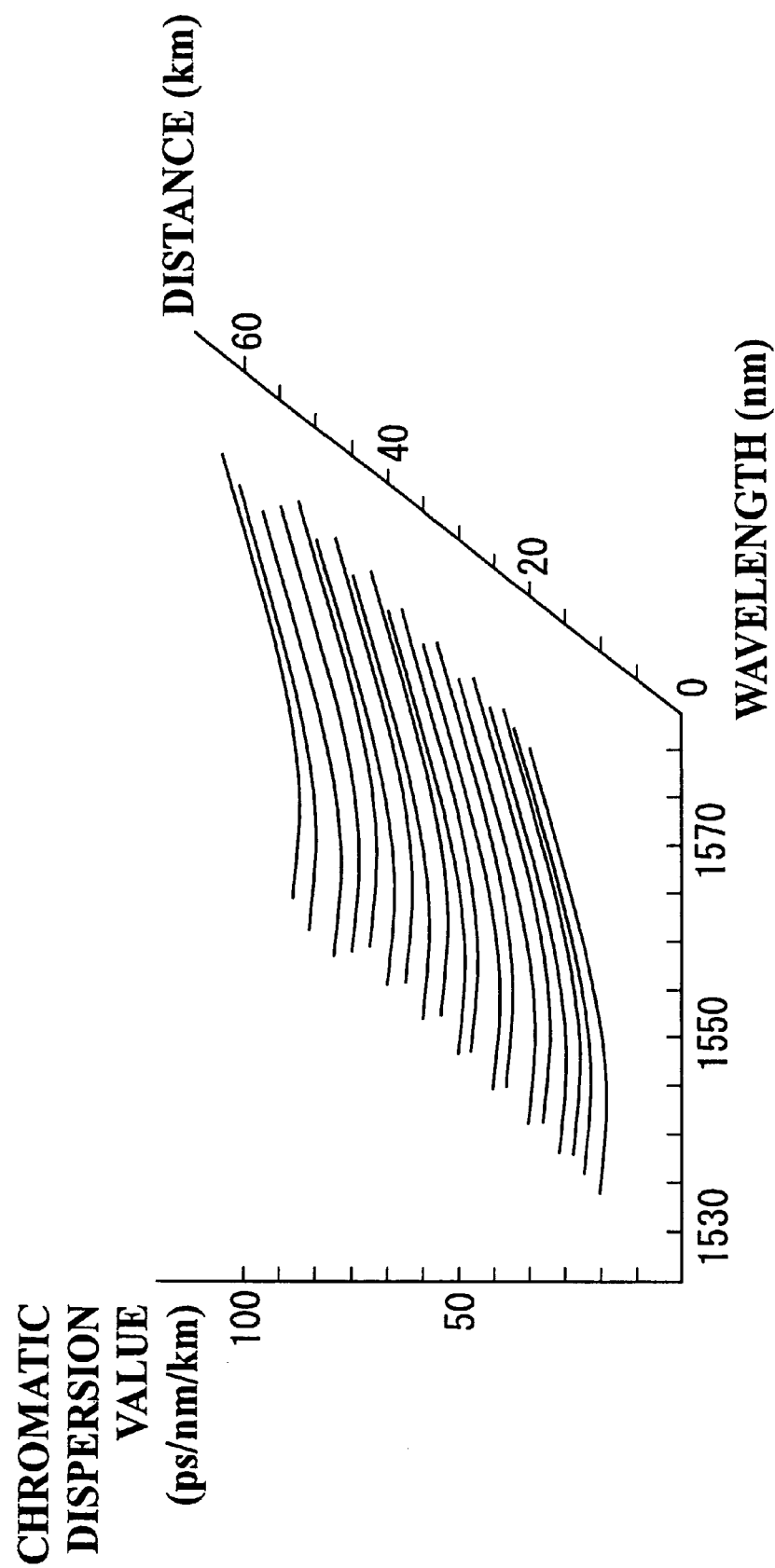
FIG. 4 is a three-dimensional graph depicting chromatic dispersion distribution values calculated by the PC.

Next, the PC 16 substitutes each of the chromatic dispersion values obtained by the chromatic dispersion distribution calculating process at different wavelengths $\lambda$, for D ($\lambda$) in Eq. (1) or Eq. (2). Then, by solving simultaneous equations with respect to the constants a, b, c, . . . , the numerical value of the constants a, b, c, . . . are obtained. Thus, the dispersion equation D ($\lambda$) at arbitrary wavelengths $\lambda$ can be acquired (Step S12). FIG. 4 is a graph depicting the wavelength-dependence of the chromatic dispersion distribution D ($\lambda$) as a function of the transmission distance along the fiber 17 to be measured.

Then, the PC 16 performs a differentiation of the chromatic dispersion distribution value D ($\lambda$) obtained in Step 12, with respect to wavelength $\lambda$ to obtain a dispersion slope of the fiber 17 to be measured. Also, the PC 16 calculates a wavelength value λ which satisfies D (λ)=0. The calculated wavelength value is regarded as the zero-dispersion wavelength (Step S13).

According to the optical fiber chromatic dispersion distribution measurement apparatus 100 to which the present invention is applied, by fitting each of the dispersion distribution data obtained by the chromatic dispersion distribution calculating process at different wavelengths λ, into the Sellmeier's approximate formula, absence of measured data in the chromatic dispersion distribution can be interpolated or compensated. That is, an extensive data-gathering over much broader range of wavelength is acquired. This makes it possible to calculate the chromatic dispersion slope and the zero-dispersion wavelength in the fiber 17 to be measured.

Although one specific embodiment of the present invention has been described, various changes and modifications may be made by those skills in the art without departing from the spirit and scope of the present invention. For example, it should be possible to employ an optical coupler instead of the OSW 14.

Furthermore, in the dispersion slope calculating process, if the interval of the wavelengths at which the dispersion distribution values are measured is too short, the linear approximation can be applied. More specifically, by drawing a straight line between two adjacent chromatic dispersion distribution data obtained by the chromatic dispersion distribution calculating process shown in FIG. 2, the slope of the straight line can be regarded as the dispersion slope.

Additionally, it should also be possible to employ two variable wavelength light sources to obtain a plurality of chromatic dispersion distribution data, instead of a plurality of fixed-wavelength light sources (the DFB-LDs 1a . . . ,3b shown in FIG. 1) as described above. Needless to say, the same advantages as the above embodiment can also be acquired in this case.

The entire disclosure of Japanese Patent Application No. Tokugan 2001-31317 filed on Feb. 7, 2001 including specification, claims drawings and summary are incorporated herein by reference in its entirety.

What is claimed is:

1. A chromatic dispersion distribution measurement apparatus, comprising:

a plurality of light sources selected from the group consisting of two variable wavelength light sources and at least three fixed-wavelength light sources which emit lights having different wavelengths from one another;

a chromatic dispersion distribution calculation unit for calculating a plurality of actual chromatic dispersion values in an optical device to be measured when a plurality of pairs of lights having different wavelengths from each other, which are emitted from the light sources, are inputted into the optical device to be measured;

a chromatic dispersion interpolation unit for interpolating an expected chromatic dispersion value between the actual chromatic dispersion values calculated by the chromatic dispersion distribution calculation unit, in order to obtain a chromatic dispersion distribution at an optional wavelength and at an optional transmission distance along the optical device to be measured;

a dispersion slope calculation unit for calculating a dispersion slope at the optional wavelength and at the optional transmission distance in accordance with the chromatic dispersion distribution; and a zero dispersion wavelength calculation unit for calculating a zero dispersion wavelength at the optional transmission distance in accordance with the chromatic dispersion distribution.

2. The chromatic dispersion distribution measurement apparatus as claimed in claim 1, wherein the chromatic dispersion interpolation unit fits a plurality of the actual chromatic dispersion values calculated by the chromatic dispersion distribution calculation unit, into a predetermined chromatic dispersion equation.

3. The chromatic dispersion distribution measurement apparatus as claimed in claim 2, wherein the predetermined chromatic dispersion equation is a Sellmeier's formula.

4. The chromatic dispersion distribution measurement apparatus as claimed in claim 1, wherein the chromatic dispersion interpolation unit employs a linear approximation by drawing a straight line between the actual chromatic dispersion values; and the dispersion slope calculation unit determines the dispersion slope by calculating a slope of the straight line.

5. A chromatic dispersion distribution measurement method, comprising:

calculating a plurality of actual chromatic dispersion values in an optical device to be measured when a plurality of pairs of lights having different wavelengths from each other are inputted into the optical device to be measured;

interpolating an expected chromatic dispersion value between the calculated actual chromatic dispersion values, in order to obtain a chromatic dispersion distribution at an optional wavelength and at an optional transmission distance along the optical device to be measured;

calculating a dispersion slope at the optional wavelength and at the optional transmission distance in accordance with the chromatic dispersion distribution; and calculating a zero dispersion wavelength at the optional transmission distance in accordance with the chromatic dispersion distribution.

6. The chromatic dispersion distribution measurement method as claimed in claim 5, wherein the interpolating is carried out by fining a plurality of the calculated actual chromatic dispersion values into a predetermined chromatic dispersion equation.

7. The chromatic dispersion distribution measurement method as claimed in claim 5, wherein the interpolating is carried out by employing a linear approximation by drawing a straight line between the calculated actual chromatic dispersion values; and the dispersion slope calculating is carried out by calculating a slope of the straight line.

8. A chromatic dispersion distribution measurement method, comprising:

calculating a plurality of light sources selected from the group consisting of two variable wavelength light sources and at least three fixed-wavelength light sources which emit lights having different wavelengths from one another;

calculating a plurality of actual chromatic dispersion values in an optical device to be measured when a plurality of pairs of lights having different wavelengths from each other, which are emitted from the light sources, are inputted into the optical device to be measured;

interpolating an expected chromatic dispersion value between the actual chromatic dispersion values calculated by the chromatic dispersion distribution calculation unit, in order to obtain a chromatic dispersion distribution at an optional wavelength and at an optional transmission distance along the optical device to be measured;

calculating a dispersion slope at the optional wavelength and at the optional transmission distance in accordance with the chromatic dispersion distribution; and calculating a zero dispersion wavelength at the optional transmission distance in accordance with the chromatic dispersion distribution.

9. A chromatic dispersion distribution measurement apparatus, comprising:

a chromatic dispersion distribution calculation unit for calculating a plurality of actual chromatic dispersion values in an optical device to be measured when a plurality of pairs of lights having different wavelengths from each other are inputted into the optical device to be measured;

a chromatic dispersion interpolation calculation unit for interpolating an expected chromatic dispersion value between the calculated actual chromatic dispersion values, in order to obtain a chromatic dispersion distribution at an optional wavelength and at an optional transmission distance along the optical device to be measured;

a dispersion slope calculation unit for calculating a dispersion slope at the optional wavelength and at the optional transmission distance in accordance with the chromatic dispersion distribution; and a zero dispersion wavelength calculation unit for calculating a zero dispersion wavelength at the optional transmission distance in accordance with the chromatic dispersion distribution.

* * * * *